US008495531B1

(12) United States Patent
Ng et al.

(10) Patent No.: US 8,495,531 B1
(45) Date of Patent: Jul. 23, 2013

(54) METHOD AND SYSTEM FOR PROVIDING AN ARCHITECTURE FOR SELECTING AND USING COMPONENTS FOR AN ELECTRONIC DESIGN

(75) Inventors: Jeffrey K. Ng, Cupertino, CA (US); Tobing Soebroto, Cupertino, CA (US); Adam R. Traidman, Mountain View, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/224,107

(22) Filed: Sep. 1, 2011

(51) Int. Cl.
*G06F 17/50* (2006.01)
*G06F 9/455* (2006.01)

(52) U.S. Cl.
USPC .............. 716/100; 716/132; 705/51; 705/500

(58) Field of Classification Search
USPC ... 716/100, 132; 700/7, 8, 10, 51, 500; 705/7, 705/8, 10, 51, 500
See application file for complete search history.

(56) References Cited

U.S. PATENT DOCUMENTS

| | | | | |
|---|---|---|---|---|
| 6,578,174 | B2 * | 6/2003 | Zizzo | 716/103 |
| 6,654,935 | B2 * | 11/2003 | Ara et al. | 716/106 |
| 6,970,875 | B1 * | 11/2005 | Dey | 717/163 |
| 7,143,136 | B1 | 11/2006 | Drenan et al. | |
| 7,353,467 | B2 * | 4/2008 | Robertson et al. | 716/138 |
| 7,546,360 | B2 | 6/2009 | Chiroglazov et al. | |
| 7,747,537 | B2 * | 6/2010 | Grim et al. | 705/67 |
| 8,156,453 | B1 * | 4/2012 | Nozarian et al. | 716/100 |
| 2003/0018888 | A1 * | 1/2003 | Ara et al. | 713/151 |
| 2003/0055520 | A1 * | 3/2003 | Tomii | 700/97 |
| 2003/0106023 | A1 * | 6/2003 | Saucier et al. | 715/513 |
| 2003/0216931 | A1 * | 11/2003 | Moriya et al. | 705/1 |
| 2004/0237054 | A1 * | 11/2004 | Tsai et al. | 716/1 |
| 2005/0034087 | A1 * | 2/2005 | Hamlin et al. | 716/3 |

* cited by examiner

*Primary Examiner* — Thuan Do
*Assistant Examiner* — Magid Dimyan
(74) *Attorney, Agent, or Firm* — Vista IP Law Group, LLP

(57) ABSTRACT

An improved approach is described for allowing designers to identify and utilize suitable IP for an electronic design. An architecture is provided that includes an IP portal and/or chip estimator to identify suitable IP from a catalog of IP, which is integrated with a hosted design environment to use and test that IP for the user's specific electronic design. An authorization mechanism may be used to control access to the IP from the IP catalog. This approach greatly enhances the probability that IP suppliers will be successfully connected with the target consumers of those IP blocks.

30 Claims, 7 Drawing Sheets

Figure 5

500

| | IP Identifier 502 | IP owner 504 | Access Policy 506 | Denial List 508 | Allow List 510 | Special Handling Instructions 512 |
|---|---|---|---|---|---|---|
| 514 | IP1 | Company 1 | Automated Authorization | (a) Domain foo.com,<br>(b) Users from company Foo | User from company Foo2 | |
| 516 | IP2 | Company 2 | Contact Owner | | | No automatic access – must check with owner before access is allowed |
| 518 | IP3 | Company 3 | Open | None | All | |

METHOD AND SYSTEM FOR PROVIDING AN ARCHITECTURE FOR SELECTING AND USING COMPONENTS FOR AN ELECTRONIC DESIGN

BACKGROUND

The invention is directed to an improved approach for designing, testing, and manufacturing integrated circuits.

A semiconductor integrated circuit (IC) has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

In recent years, constant innovation in silicon process technology has drastically reduced the price and increased the performance and functionality of integrated circuit devices, thus stimulating the development of the electronics manufacturing and information processing industries. In turn, these fast growing industries impose increasing demands on the integrated circuit design system developers for still faster, cheaper, and more powerful devices. To address these demands, many designers of electronic systems have moved to a methodology known as Block Based Design ("BBD"), in which a system is designed by integrating a plurality of existing component design blocks. These pre-designed blocks may be obtained from internal design teams or licensed from other design companies. Moreover, pre-designed blocks may be developed to meet different design requirements and constraints.

Many companies and organizations have created entire libraries of component design blocks and other units of electronic design (also referred to in the art as "intellectual property blocks", "IP blocks", "IP components", or "cores"), and have created businesses out of licensing or selling these IP blocks to other companies that use these design blocks to create an electronic product. As of the filing of this application, there exist a large number of companies that supply such IP blocks to customers, and many thousands of such IP blocks available to be integrated into a customer's own design.

One of the significant challenges faced by a modern designer is that, given the large number of potential suppliers of IP blocks, how the designer can best and most efficiently identify which of the suppliers is able to provide an IP block that will suit the needs of the designer for a given design project. This is not a trivial problem given the existence of such a large number of vendors and suppliers of IP blocks and the even larger number of IP blocks that are available for licensing or purchase. The fact that certain hard macros are available on specific, predefined processes adds another layer of complexity in terms of IP selection.

There are existing web sites and systems that provide portals for connecting suppliers and consumers of IP blocks together. These portals ("IP portals") provide a facility where, even if the user cannot identify or locate the suitable IP or IP vendor on his or her own, the portal provides a framework for establishing communications between the consumer and any appropriate IP vendors for the requested IP. An example of such an approach for connecting IP consumers with IP providers is described in co-pending U.S. application Ser. No. 12/252,577, now U.S. Pat. No. 8,156,453, filed on Oct. 16, 2008, entitled "METHOD AND SYSTEM IDENTIFYING AND LOCATING IP BLOCKS AND BLOCK SUPPLIERS FOR AN ELECTRONIC DESIGN", which is here incorporated by reference in its entirety.

Conventionally, once the IP consumer has identified a set of IP blocks that are potentially usable in his/her electronic design, the IP consumer must then engage in a highly manual and potentially cumbersome process involving multiple complicated stages in an attempt to see if the identified IP blocks would in fact be suitable for the electronic design. For example, the IP consumer may need to individually deal with each IP vendor to obtain detailed information about each and every one of the potentially usable IP blocks (with the required information potentially ranging from technical to legal to business terms). The user would also need to make sure that an adequate set of design tools and system resources are then available utilize those IP blocks. Only then can the user even begin to start the process of incorporating the IP blocks into the electronic design for the detailed feasibility analysis. After engaging in this lengthy process, the user may end up discovering that the selected IP blocks are actually not adequate for the intended design. The entire process is highly non-standard, and indeed, the differing situations for each individual IP consumer makes the job even more complicated to configure and set up for those IP consumers.

As is evident, this situation can conventionally create a highly inefficient process that negatively affects the IP consumer's ability to effectively identify the exact set of IP that can or should be used in his/her design. In addition, this situation also negatively affects the ability of the IP vendors to market the IP blocks to IP consumers that really should be the customers for their IP block products.

SUMMARY

Some embodiments of the present invention provide an improved approach for allowing designers to identify and utilize suitable IP for an electronic design. According to some embodiments, an architecture is provided that includes an IP portal and/or chip estimator to identify suitable IP from a catalog of IP, which is integrated with a hosted design environment to use and test that IP for the user's specific electronic design. An authorization mechanism may be used to control access to the IP from the IP catalog. This approach greatly enhances the probability that IP suppliers will be successfully connected with the target consumers of those IP blocks.

Other additional objects, features, and advantages of the invention are described in the detailed description, figures, and claims.

BRIEF DESCRIPTION OF FIGURES

FIG. 5 shows a chart with example information that can be maintained and used to provide access control over IP according to some embodiments of the invention.

DETAILED DESCRIPTION

Embodiments of the present invention provide improved methods, systems, and architectures for providing a secure environment for enabling designers to gain access to IP. The secure environment allows users to perform real design activities with the IP so that the users can realistically obtain accurate expectations of the suitability of that IP for their designs.

Figure 1:
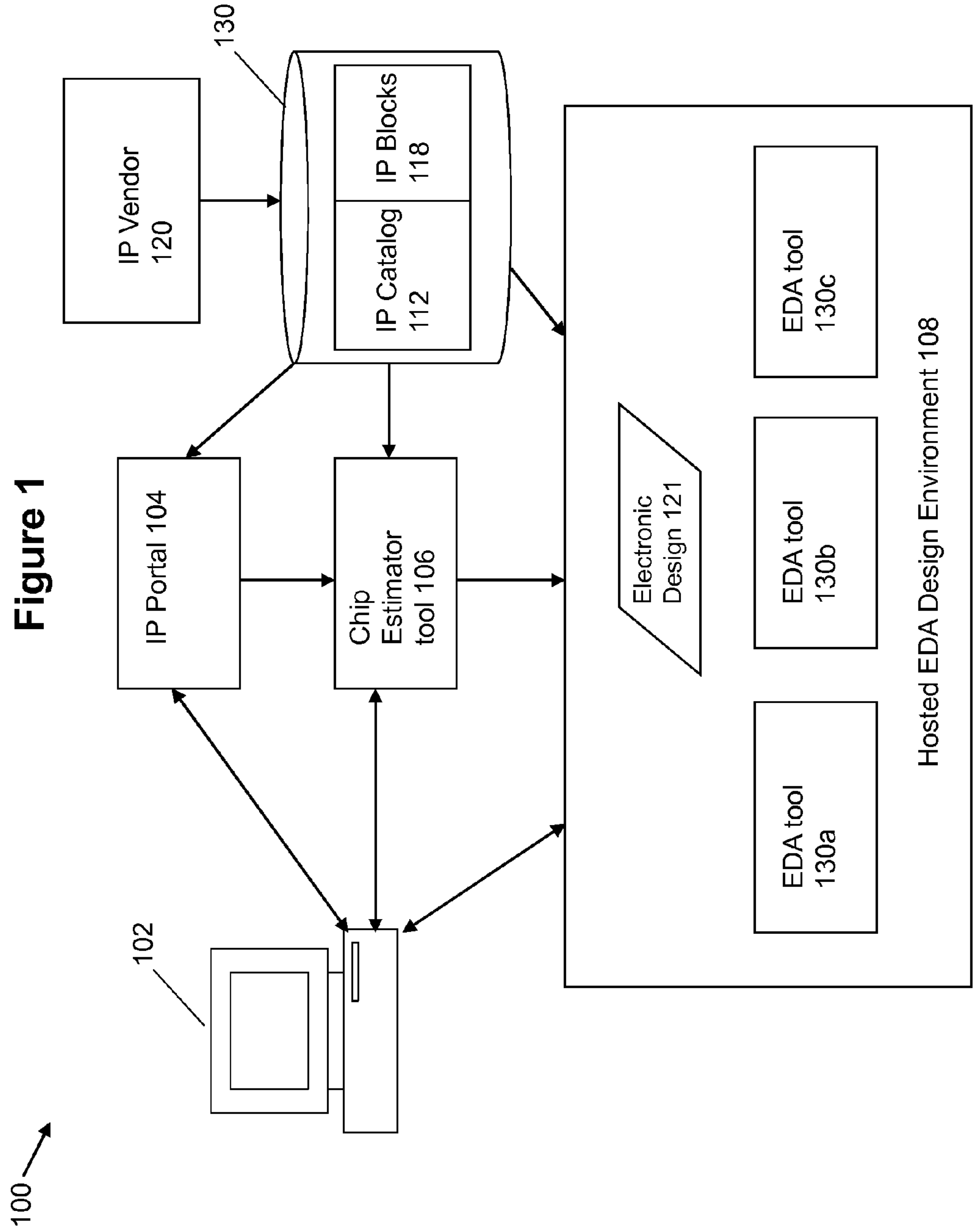
FIG. 1 depicts an architecture that includes an IP portal and/or chip estimator to identify suitable IP from a catalog of IP, which is integrated with a hosted design environment to use and test that IP for the user's specific electronic design, according to some embodiments of the invention.

The general idea behind some embodiments of the invention is that an IP portal and/or planning/estimator tool(s) can be used in conjunction with a hosted EDA design environment to allow users to use and experiment with the IP from IP vendors. FIG. 1 shows an example architecture 100 that can be used to implement some embodiments of the invention. FIG. 1 shows a system 100 for facilitating identification and location of IP blocks according to one embodiments of the invention, which may include one or more users at one or more user stations 102 that access a portal 104 to research, identify, and/or obtain IP blocks. The portal 104 operates by connecting suppliers and consumers of IP blocks together, e.g., by providing services to facilitate a connection between a consumer of electronic IP and the provider or vendor of the electronic IP.

The users at user station 102 correspond to any individual, organization, or other entity that uses system 100 for locating IP blocks for either research purposes or to integrate the IP blocks in an electronic design 121. The user stations 102 could be implemented using any suitable platform. For example, user station 102 may be implemented as a remote workstation networked to the portal 104 across the internet, where the data from the portal 104 is configured and displayed using a web browser.

The user station 102 may be associated with a database or other computer readable medium that holds data regarding the user's electronic design and/or one or more specifications relating to the electronic design. The one or more specifications comprise any set of information or parameters that the user has developed to determine the requirements of the user's electronic design and of cells and blocks that are needed to implement the electronic design. For example, the specification could include details of requirements for one or more IP blocks for the electronic design, such as the function, process, technology node, size, acceptable power parameters, acceptable leakage parameters, and gate count of a desired IP block.

The portal 104 is a network-accessible site that facilitates access to a database 130 containing a catalog 112 of IP blocks 118 that are subject to purchase or licensing by the user at user station 102. The IP catalog 112 comprises a listing of the IP blocks 118 that have been registered at portal 104 by IP vendors 120. Based upon the specifications developed by the user for the electronic design, the user at user station 102 will access portal 104 to search the IP catalog 112 for any IP blocks 118 that suitably correspond to the requirements of the user's specification. The information in the IP catalog 112 regarding IP blocks 118 is provided by IP vendors 120. One possible approach that can be taken for IP vendors to register new IP blocks 118 into the IP catalog 112 is described in co-pending U.S. application Ser. No. 12/252,577, now U.S. Pat. No. 8,156,453, filed on Oct. 16, 2008, entitled "METHOD AND SYSTEM IDENTIFYING AND LOCATING IP BLOCKS AND BLOCK SUPPLIERS FOR AN ELECTRONIC DESIGN", which is here incorporated by reference in its entirety. Each IP vendor 120 corresponds to a supplier of an item of IP that is listed in IP catalog 112, or is nevertheless registered as a source of IP even if not presently listing any items of IP in IP catalog 112. An example of a suitable IP portal is the ChipEstimate.com portal available at www.chipestimate.com.

The user can obtain information about suitable IP blocks 118 for an electronic design 121 by accessing the IP catalog 112 from the portal 104. The user would search the IP catalog 112 using any suitable search criteria to obtain a list of IP blocks 118 that match the search criteria entered by the user. Based upon the search results, the user is provided with information relevant to making a decision to either license or purchase the IP block 118 for insertion into the user's design.

In certain embodiments, the user may also access a chip estimator or prototyping tool 106. The estimator tool 106 provides a planning tool to plan, outline, and analyze the characteristics and production requirements of an electronic product. For example, the estimator tool 106 could provide an early stage estimation of anticipated production characteristics to an electronic product by analyzing the specifications and requirements of an electronic design. By analyzing the functional and physical requirements of an electronic design, the estimator tool chip 106 provides users with an estimate of the chip size, power, leakage and cost of the final electronic product. An example of a commercially available planning/estimator tool is the InCyte Chip Estimator product available from Cadence Design Systems, Inc. of San Jose, Calif.

The outputs of the portal 104 and/or the estimator tool 106 are fed to a hosted EDA design environment 108. In some embodiments, the hosted EDA design environment 108 operates in a "software as a server" or "SaaS" model to allow users to utilize a set of EDA tools 130*a-c*, where the EDA tools 130*a-c* are hosted by a third party EDA service or vendor. The general idea and benefit behind the SaaS model is that, in this usage model, users do not need to individually purchase, install, and maintain a given set of software in order to use those items of software. Instead, a hosting service will maintain all of the software and hardware that are needed to operate the set of software tools 130*a-c* provided in the SaaS model. The software tools 130*a-c* are licensed or otherwise provided to users as a service on an as-needed or on-demand basis. This approach to application delivery can be considered part of the utility computing model where all of the technology is in the "cloud" accessed over the Internet as a service. The user is provided a private set of resources (e.g, in a secure virtual "chamber") to perform design activities with the hosted EDA tools 130*a-c*, so that other users cannot view or have access to the user's private information and designs 120. With regard to EDA tools, an example of a hosted EDA design environment is the Hosted Design Solution (HDS) provided by Cadence Design Systems, Inc. of San Jose, Calif.

In operation, the user at user station 102 will use the IP portal 104 perform a search of the IP catalog 112 for specific item(s) of IP 118 to match certain requirements needs by the user for the planned electronic design 121. At this level, the portal 104 only provides high level information about the IP blocks 118, such as data sheet information about the IP blocks. The user will view the datasheets to select particular ones of the available IP that the user feels is likely to match the user's requirements within the electronic design.

The list of selected IP can be provided to the planner/estimator tool 106 with a high-level design specification of the design, including information such as gate counts, performance goals, off-chip bus connections, memory configurations and optional connectivity. Based upon these parameters, the planner/estimator tool 106 will produce a datasheet with estimations of the final silicon product, including information such as die area, performance, power, leakage, yield, package recommendations, and production chip cost.

It is noted that at this stage, the user has not yet been provided with the detailed design data for the selected IP blocks. Instead, the chip estimation and planning is still using data about the IP blocks that are higher level abstractions of the lower level design details for the IP blocks. This provides an advantage for the user when performing early stage chip planning and estimation tasks, since working at an abstracted level allows for much faster analysis results. This approach also provides advantages for the IP provider, since the IP provider can maintain greater controls over the confidentiality of the design details for the IP blocks at this stage. The disadvantage, of course, is that chip planning and analysis using just the abstracted view of the IP blocks may produce lower quality or less accurate results as compared to planning/analysis that utilizes the full set of design details for the IP blocks.

The user may decide at this point that he/she would like to obtain the full design details for the selected IP blocks. For example, the results of chip planning with the abstracted versions of those IP blocks may indicate a reasonable probability of success for the intended electronic design when using those IP blocks, which would prompt the user to want to obtain the actual IP blocks, e.g., because the estimator tool provided an estimate or prediction that the design will successfully meets the user's requirements in terms of sizing, power consumption, timing, etc. At this point, the user may decide to obtain and work with the full design details for the selected IP blocks. The user may then use the full details of the IP blocks to actually implement the design 120, or even just to experiment with the IP blocks to confirm that that selected IP blocks would indeed be useful in the intended electronic design.

With conventional electronic design methodologies, this process of obtaining and using the IP blocks could end up being an onerous process, since the user may need to undergo the laborious process of negotiating with the IP vendors to obtain the IP blocks. The user would also need to make sure that the correct EDA tools to use those IP blocks are properly installed and configured. This process may require an excessive and expensive amount of effort, particularly if the intent of the user is to merely perform some upfront experimentation just to see if the IP block will function properly for their intended purpose in the user's electronic design. Moreover, the IP vendor may be hesitant to provide the IP blocks on this type of "trial" basis for the user to perform experimentation, due to real concerns about losing the confidentiality of the deign details for the IP blocks.

With embodiments of the present invention, these problems are easily resolved by providing a hosted EDA design environment 108 to allow the users to experiment with the IP blocks. In some embodiments, the design environment 108 is implemented using the SaaS model to provide a set of EDA tools 130*a-c* that are configured and maintained so that the users can create an electronic design 120 using the IP blocks. This provides the user access to any EDA tools that may be needed to actually make use of the IP blocks, without requiring each of the users to individually purchase, install, and maintain those EDA tools and the underlying hardware needed to run those tools.

Moreover, the design environment 108 provides a vehicle for IP vendors to securely provide IP blocks to potential customers, while still maintaining confidence in the security and confidentiality of those IP blocks. This is implemented by providing secure controls over access rights to the IP blocks, where only authorized users are given access to the full details of the IP blocks. In addition, the design environment can be configured to prevent the user from being able to export the electronic design 120 that include details about the IP blocks unless and until the user has actually purchased rights to those IP blocks.

The hosted EDA design environment 108 can be implemented with any suitable combination of EDA tools 130*a-c* and by any host organization, so long as the provided EDA tools 130*a-c* are adequate to utilize the IP blocks 118 to perform design activities for the electronic design 121. In some cases, the design environment will be hosted by a specific EDA tool vendor, which will allow the vendor to showcase and cross-market those EDA tools. Different tool vendors may each set up their own hosted design environments for this purpose of allowing potential customers to "try out" and potentially purchase their EDA tools. In other cases, an organization may choose to implement the hosted environment as a SaaS service, deriving revenue by hosting EDA tools on behalf of electronic design customers. These SaaS providers may choose to provide EDA tools from multiple companies, or may choose to provide EDA tools from only a single EDA tool vendor (e.g., in the situation where a specific EDA tool vendor is operating the SaaS service).

Figure 2:
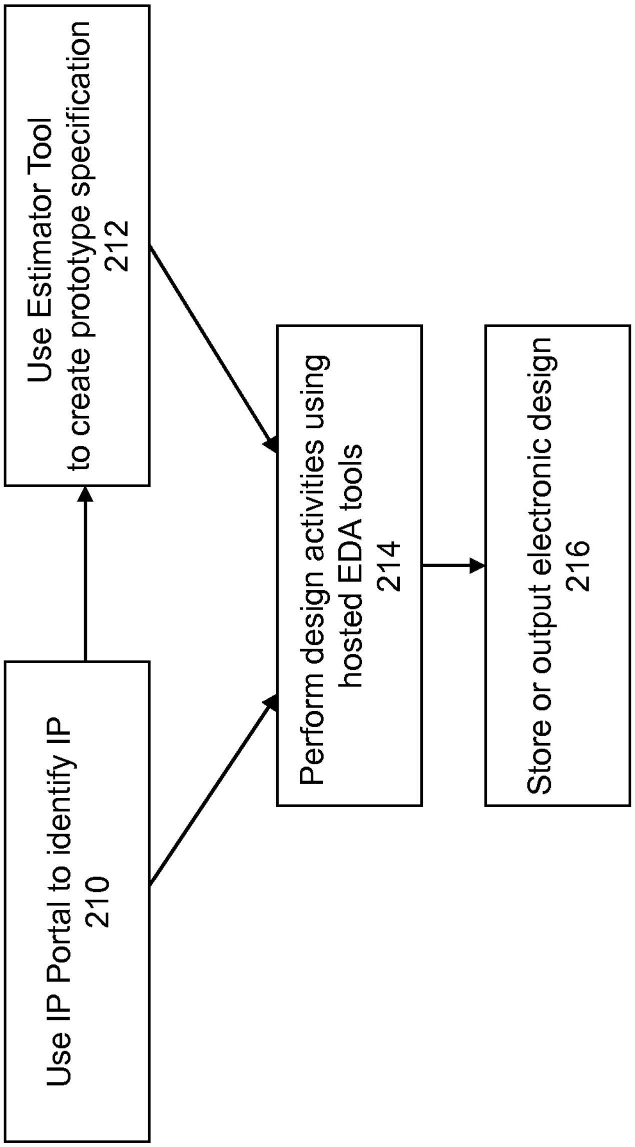
FIG. 2 shows a flowchart of an approach for using an architecture that includes an IP portal and/or chip estimator to identify suitable IP from a catalog of IP, which is integrated with a hosted design environment to use and test that IP for the user's specific electronic design, according to some embodiments of the invention.

FIG. 2 shows a flowchart of an approach for providing a secure environment for enabling designers to gain access to IP. At 210, the IP portal is used to identify specific items of IP of interest to the user. The portal enables users to capture a list of IP that they are interested in using through an IP Listing feature of the portal site.

The "IP List" can be exported to an estimator tool, where at 212, the estimator tool is used to perform size, power, performance, and cost estimation. The estimator tool has the ability to export design intent information in form of industry standard file formats, such as Verilog, LEF, DEF, and CPF. The request that is generated from the estimator tool may have a feature which is the bundled up design intent information that can be exported from the estimator tool. The design intent information can be bundled up in the access request made to the hosted website and then unpacked in the hosted design environment for the user. According to some embodiments, the integrated nature of the portal and estimator tool enables users to functionally request access to the real IP views from either the portal or the estimator tool.

At 214, the user can the perform design activities with the selected IP using a hosted design environment. The hosted design environment permits access to the real IP views in a manner that allows for a secure environment for experimentation with the selected IP.

At 216, the electronic design or testing results from the electronic design can then be stored or output in some fashion to a tangible computer readable medium. In some embodiments, controls are applied to the electronic design so that the user cannot export the design outside of the hosted design environment unless certain conditions are met. For example, the user may need to purchase or otherwise obtain suitable authorization from an IP vendor begin being allowed to export the design or test results. Likewise, in certain business models, the user may need to purchase or otherwise obtain authorization from the tool vendor or SaaS service provider to export the finished design or test results.

Figure 3:
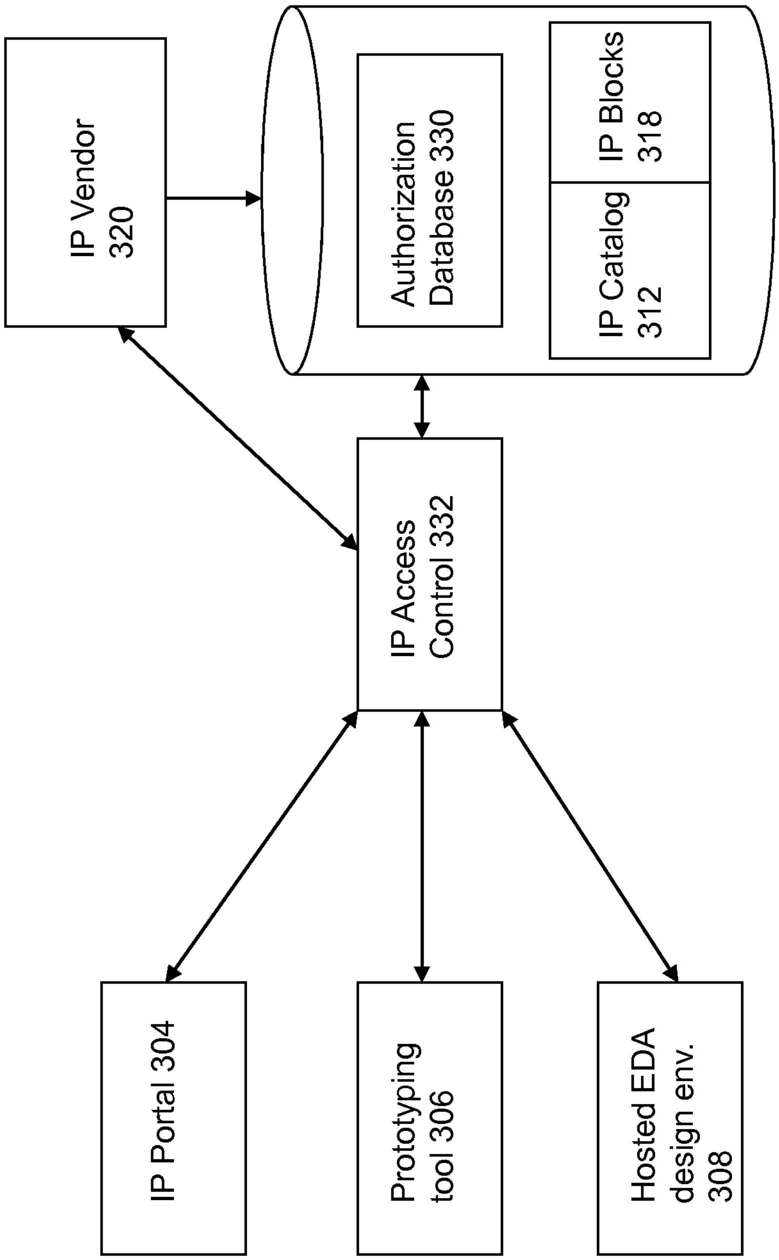
FIG. 3 shows an architecture for providing access control over IP according to some embodiments of the invention.

An authorization/authentication loop is enabled, so that IP vendors and/or host for the design environment can prevent and/or limit misuse of assets and technology. As shown in FIG. 3, an IP access control mechanism 332 is used to control access to the IP blocks 318. In certain embodiments, the access control mechanism 332 is provided by an external domain that is separate from the domain for the portal site 304, e.g., by the provider of the hosted design environment 308.

Figure 4:
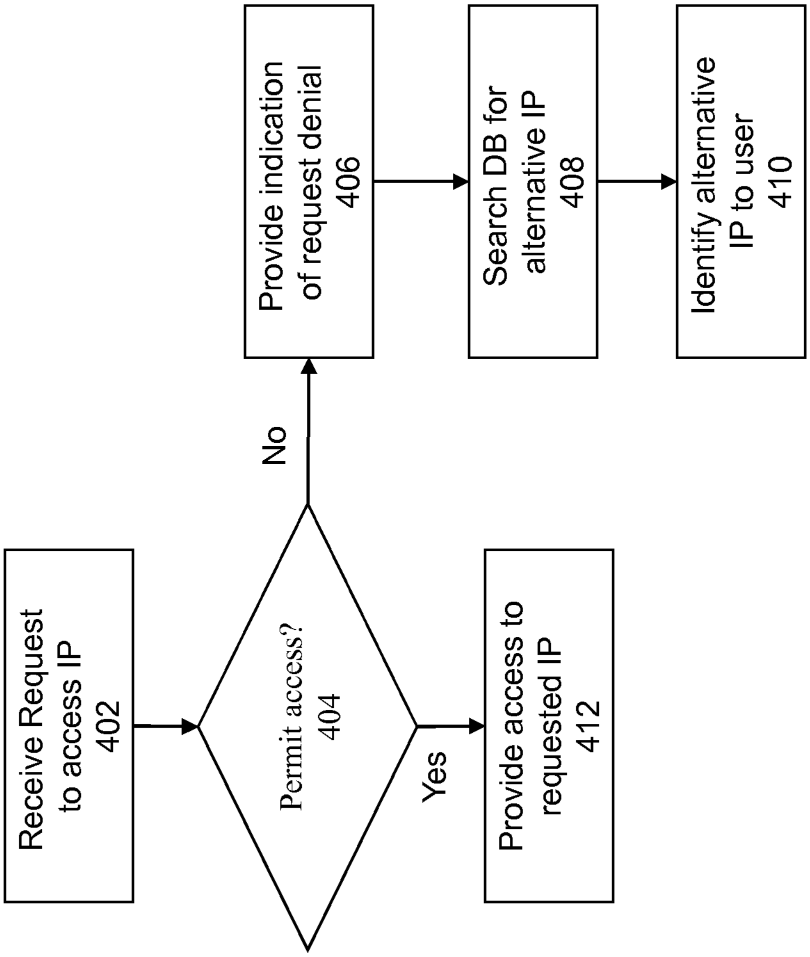
FIG. 4 shows a flowchart of an approach for providing access control over IP according to some embodiments of the invention.

FIG. 4 shows a flowchart of an authorization process according to some embodiments of the invention. When a user is ready to begin experimenting with the real IP views, the user can initiate a request at 402 from either the portal site or the estimator. In either case, an HTTP (or HTTPS) request is posted to the site that handles the access control mechanism. In some embodiments, the HTTP request contains (a) contact information for the user that has requested access; (b) an IP manifest, listing the IP partner name and the IP macro name.

Once the request is received, the information is stored into a database 330 and the authorization process begins. Such authorization may need to be performed both by the IP provider as well as the host of the design environment.

For the IP provider authorization, any suitable approach can be taken to obtain authorization. In some embodiments, the authorization process can be automated using a set of access policies or access rules. The access policies define the parameters under which access is permitted to certain users. For example, a first type of policy may automatically permit or deny access if the user is from certain identified companies or organizations, e.g., to deny access if the user is an employee of a competitor to the IP provider. A second example type of access policy may be set up to always allow access to users that request access. A third example type of policy may be established to prevent automated access, such that the IP provider is always contacted to check whether access is permitted to the user. In this approach in some embodiments, for each IP component an email is sent to the appropriate contact at the IP partner with the following information: (a) contact information, including name, email address, company, and phone number; (b) name of the requested IP component; (c) URL link to the hosted website to approve access to the IP component for the given user; and (d) URL link to the hosted website to deny access to the IP component for the given user.

Similar authorization activities may also be performed by the host of the design environment, where a set of access policies are established to permit automated access or requiring contact with the host to allow such access. For each request in some embodiments, an email is sent to the appropriate contact at the host with the following information: (a) contact information, including name, email address, company, and phone number; (b) URL link to the hosted website to approve access to the design environment chamber for the given user; and (c) URL link to the hosted website to deny access to the design environment chamber for the given user.

If authorization for the desired access is obtained for the requested IP components, then a process is triggered at 412 to create a suitable hosted design environment or chamber with all the IP views for all the IP that the user has requested. An email is then sent to the user with the connection information to the hosted design environment or chamber. The chamber is enabled with one-way file transfer access, so that the user can bring their design into the chamber for experimentation. All file transfers out of the chamber are disabled to protect the IP vendor, as well as the host. In an alternate embodiment, the industry standard design views exported from the chip estimator tool or IP portal can be placed into the chamber as a starting point for the experimentation.

If authorization to an IP component is denied, then an indication of the denial is given to the user at 406. In some embodiments, the user would return back to either the portal or estimator to manually search for a replacement IP component. Alternatively, the denial would trigger an automated search of the IP database at 408 for other similar IP components that may satisfy the requirements of the user. If they exist, these alternative IP components would be identified and presented to the user at 410. If these alternative IP components are acceptable to the user, then the authorization process would be performed again for these alternative IP components.

FIG. 5 shows an example set of information that can be maintained of authorization information used by the access control mechanism according to some embodiments of the invention. Table 500 includes a column 502 that identifies the name of a given IP component that is available for selection by a user. Column 504 identifies owner information for the IP component, which possibly includes the contact information that is used to obtain authorization for user access. Column 506 identifies the access policy that is associated with an IP component. Column 508 contains a "denial list" that identifies the conditions under which a user request for the IP would be automatically denied. Column 510 contains an "allow list" that identifies conditions under which a user request for the IP would be automatically granted. Column 512 contains any other special handling instructions that the IP owner may wish to establish for the IP component.

Table 500 includes three rows 514, 516, and 518 that show examples settings for IP components IP1, IP2, and IP3, respectively. The example settings in row 514 for IP1 indicate, in column 506, that user access to this IP component may be handled automatically. For example, as configured using the parameters in column 508, any users attempting to access the IP component IP1 from the "foo.com" domain or who is an employee of the Foo company would be automatically denied access to this IP component. On the other hand, as configured in the parameters of column 510, any user from the Foo2 company would be automatically granted access rights to the IP component.

The example settings in row 516 for IP2 indicate, in column 506, that user access to this IP component must be handled by contacting the IP owner. Therefore, users will not be automatically granted or denied access to the IP2 component. Instead, the IP owner will be contacted with information about the user, and the IP owner will make the determination of whether to grant or deny access.

The example settings in row 518 for the IP3 component indicate, in column 506, that user access to this IP component is completely open. Therefore, users will automatically be granted access to the IP3 component.

Figure 6:
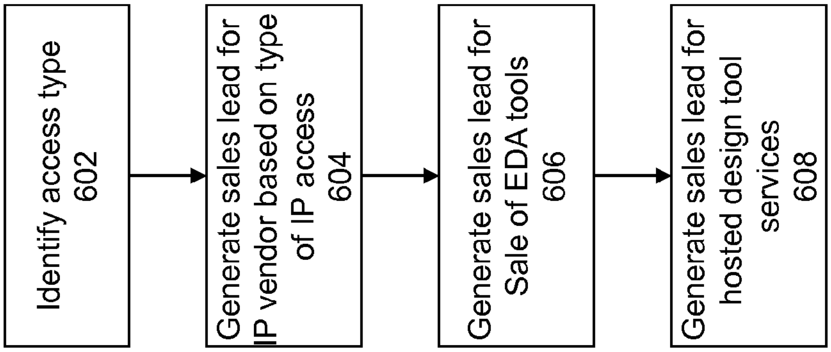
FIG. 6 shows a flowchart of an approach for providing business improvements for connecting IP purchasers with suppliers of products, tools, and services according to some embodiments of the invention.

The embodiments of the invention provide advanced techniques and entry points to improve business and marketing opportunities for the IP vendors and tool providers. As shown in FIG. 6, the first action at 602 is to identify the type of access that the user has obtained to the IP component. For example, a determination is made whether the user has accessed only a datasheet for the IP using the portal, has performed planning or estimation tasks using the estimator, or whether the user might have performed full design activities using the hosted design environment.

Identification of the type of access by the user can be important in determining the type and/or intensity of the follow-up business or marketing activity is directed to that user. For example, consider the follow-up marketing activities by the IP vendor at 604. The IP vendor may utilize the access history by the user to determine whether this user is a realistic sales lead for a serious customer or if the user was merely "kicking the tires" of the IP component and is not realistically considered an immediate customer. One way to make this determination is by checking whether the user has actually generated a full and working electronic design using the vendor's IP component. If the user has invested the time and energy to use the hosted design environment to create an actual working design, then this user is likely to be considered a hot prospect for an immediate sale, and will be given higher priority as a sales lead by the IP vendor. On the other hand, if the user merely accessed the datasheet for the IP component, and ended up not using the design environment or used the design environment with another vendor's IP, then this user is likely to be considered to be a lower priority sale lead.

Similarly, the kind of activities performed by the user can be used, at 606, to generate sales leads by EDA tool vendors with regards to the user as a possible customer for specific EDA tools. For example, if the user utilized a certain set of tools within the hosted design environment, then this user is likely to be considered a hot prospect for an immediate sale of those EDA tools, and will be given higher priority as a sales lead by the EDA tool vendor.

In a similar manner, the kind of activities performed by the user can be used, at 608, to generate sales leads with regards to sales to the user as a possible customer for the hosted design environment. A possible business model exists to allow users to obtain free access to the hosted design environment to implement an electronic design using the selected IP components. However, the user is precluded from exporting the design if the user's access is on the basis of free access. The fact that the user has spent time creating an electronic design makes the user a hot prospect for an immediate sale of full services of the hosted design environment, including the right to export the user's completed design.

One or more databases 130 can be used to track the activities of users as they work with the IP. The database can track the IP that has been accessed, the type of activities performed by users with regard to the IP, the EDA tools/services that were actually used by the user, and the stage of design activities for those selected items of IP. This information is then used to automatically generate sales leads, where the sales leads can be categorized or organized by analyzing whether the leads are higher or lower priority leads.

Therefore, what has been described is an improved approach for locating and identifying IP for an electronic design. The embodiments of the invention provide numerous benefits to users, IP providers, and EDA tool provides. The main benefit to the user is that a path is provided from their initial IP List to the real IP views and enabling them access to the tools and technology to experiment with the IP. The main benefit to the IP provider is that it provides a higher level quality engagement opportunity in a secure environment. Their IP views are protected since users cannot export data files outside of the secure virtual chamber. The main benefit to the EDA tool vendor or provider is that potential customers are exposed to the tools and/or design environment service, and thus are more likely to want to purchase the tool or service in the future.

System Architecture Overview

Figure 7:
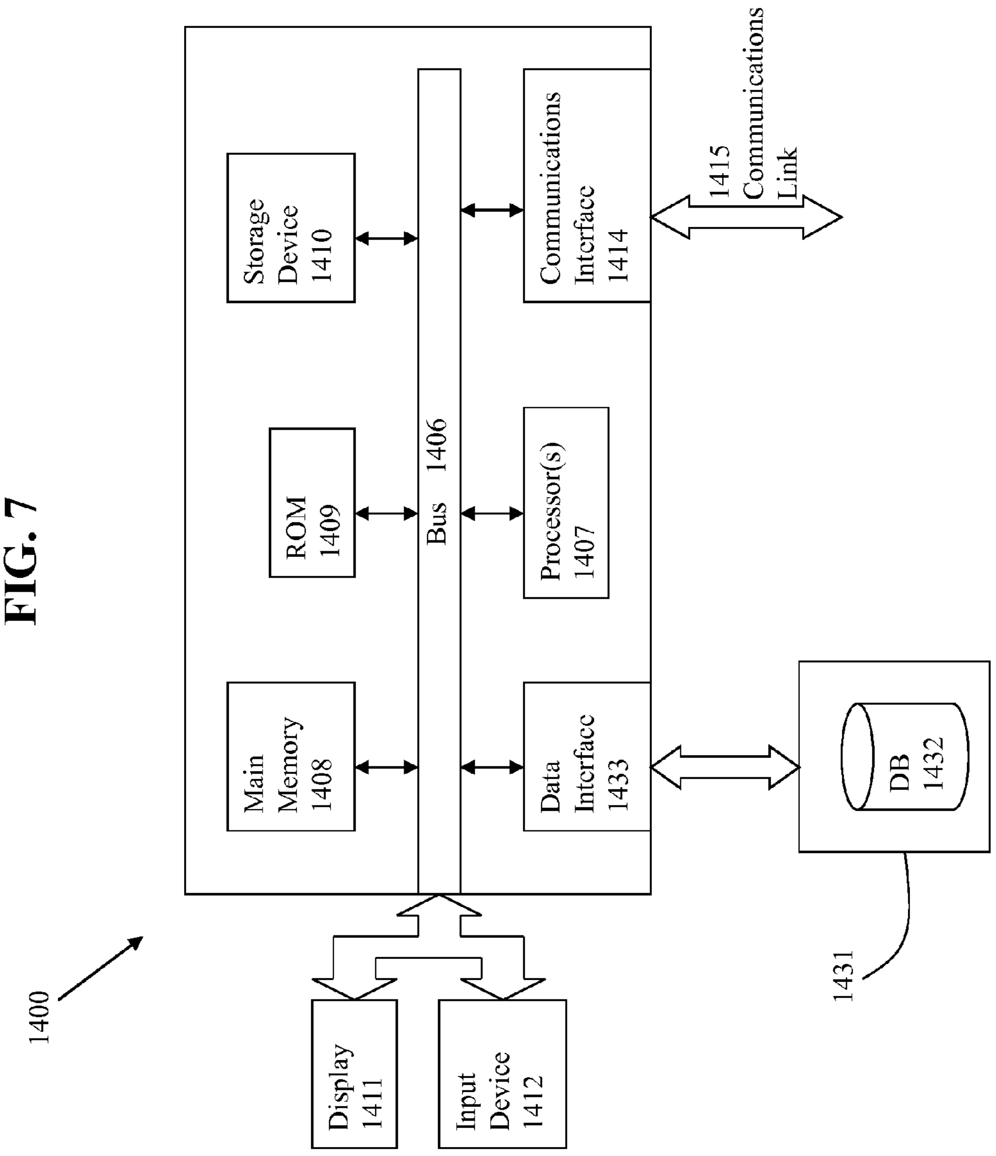
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for using a processor to identify and use IP for an electronic design, comprising:

using a computing system having at least one processor to perform a process, the process comprising:

using a portal to perform a search of an IP catalog for an IP component that is to be used in a block-based implementation of an electronic design, wherein the IP component complies with a set of component requirements to be used within the electronic design; and using the IP component in a hosted design environment to implement the electronic design, where the hosted design environment, which is not hosted by a user, is operated by a third party service provider to provide a hosting service for purchasing or licensing the IP component so that the user need not individually purchase or license the IP component to be used to implement the electronic design, and the hosted design environment obtains information from a search result from the portal.

2. The method of claim 1 in which the hosted design environment comprises EDA tools.

3. The method of claim 1 in which the hosted design environment operates using a software as a service model.

4. The method of claim 1 in which user is provided with detailed design information for the IP component within the hosted design environment but is not provided with detailed design information at the portal.

5. The method of claim 1 further comprising using an estimator tool to perform chip planning with the IP component.

6. The method of claim 5 in which the output of the estimator tool is used in the hosted design environment to implement the electronic design.

7. The method of claim 1 further comprising using an access control mechanism to control access to the IP component.

8. The method of claim 7 in which the access control mechanism provides automated access to the IP component using policy rules.

9. The method of claim 8 in which the policy rules are implemented using information about the user, an organization, or the user's relationship to the organization.

10. The method of claim 8 in which the policy rules require an IP vendor to approve access to the IP component.

11. A computer program product embodied on a non-transitory computer usable medium, the non-transitory computer readable medium having stored thereon a sequence of instructions which, when executed by a processor causes the processor to execute a method for identifying and using IP for an electronic design, the method comprising:

using a portal to perform a search of an IP catalog for an IP component that is to be used in a block-based implementation of an electronic design, wherein the IP component complies with a set of component requirements to be used within the electronic design; and using the IP component in a hosted design environment to implement the electronic design, where the hosted design environment, which is not hosted by a user, is operated by a third party service provider to providing a hosting service for purchasing or licensing the IP component so that the user need not individually purchase the IP component to be used to implement the electronic design, and the hosted design environment obtains information from a search result from the portal.

12. The computer program product of claim 11 in which the hosted design environment comprises EDA tools.

13. The computer program product of claim 11 in which the hosted design environment operates using a software as a service model.

14. The computer program product of claim 11 in which user is provided with detailed design information for the IP component within the hosted design environment but is not provided with detailed design information at the portal.

15. The computer program product of claim 11 further comprising using an estimator tool to perform chip planning with the IP component.

16. The computer program product of claim 15 in which the output of the estimator tool is used in the hosted design environment to implement the electronic design.

17. The computer program product of claim 11 further comprising using an access control mechanism to control access to the IP component.

18. The method of claim 7 in which the access control mechanism provides automated access to the IP component using policy rules.

19. The computer program product of claim 18 in which the policy rules are implemented using information about the user, an organization, or the user's relationship to the organization.

20. The computer program product of claim 18 in which the policy rules require an IP vendor to approve access to the IP component.

21. A system for identifying and using IP for an electronic design, comprising:

a computer system comprising at least one processor;

a portal on the computer system to perform a search of an IP catalog for an IP component that is to be used in a block-based implementation of an electronic design, wherein the IP component complies with a set of component requirements to be used within the electronic design; and a hosted design environment that uses the IP component to implement the electronic design, where the hosted design environment, which is not hosted by a user, is operated by a third party service provider to provide a hosting service for purchasing or licensing the IP component so that the user need not individually purchase the IP component to be used to implement the electronic design, and the hosted design environment obtains information from a search result from the portal.

22. The system of claim 21 in which the hosted design environment comprises EDA tools.

23. The system of claim 21 in which the hosted design environment operates using a software as a service model.

24. The system of claim 21 in which user is provided with detailed design information for the IP component within the hosted design environment but is not provided with detailed design information at the portal.

25. The system of claim 21 further comprising an estimator tool to perform chip planning with the IP component.

26. The system of claim 25 in which the output of the estimator tool is used in the hosted design environment to implement the electronic design.

27. The system of claim 21 further comprising an access control mechanism to control access to the IP component.

28. The system of claim 27 in which the access control mechanism provides automated access to the IP component using policy rules.

29. The system of claim 28 in which the policy rules are implemented using information about the user, an organization, or the user's relationship to the organization.

30. The system of claim 28 in which the policy rules require an IP vendor to approve access to the IP component.

* * * * *